United States Patent

Keller

[15] 3,646,878

[45] Mar. 7, 1972

[54] APPARATUS FOR BARBECUING FOOD
[72] Inventor: Ernest Keller, Chicago, Ill.
[73] Assignee: Louis Jutzi, Palos Park, Ill.
[22] Filed: May 11, 1970
[21] Appl. No.: 36,137

[52] U.S. Cl. .................................99/339, 99/107, 99/386, 99/443, 99/446, 99/DIG. 14
[51] Int. Cl. ...........................................A47j 37/00
[58] Field of Search................99/107, DIG. 14, 339, 386, 99/400, 446, 443

[56] References Cited

UNITED STATES PATENTS

| 2,997,566 | 8/1961 | Pierce et al. | 99/DIG. 14 |
| 3,321,314 | 5/1967 | Jeppson | 99/386 X |
| 3,427,171 | 2/1969 | Jeppson | 99/386 X |
| 3,479,188 | 11/1969 | Thelen | 99/339 X |

FOREIGN PATENTS OR APPLICATIONS

| 1,197,014 | 7/1970 | Great Britain | 99/339 |

*Primary Examiner*—Billy J. Wilhite
*Attorney*—Spector & Alster

[57] ABSTRACT

Chicken halves are placed on a continuously moving horizontal conveyor and conveyed first through a charcoal searing station that sears the bottom side of the product, then through a microwave section where the cooking takes place in an atmosphere of charcoal smoke from the charcoal fire, then through an infrared heating section for forming a crust and browning the top surface thereof.

4 Claims, 7 Drawing Figures

PATENTED MAR 7 1972 3,646,878

INVENTOR
ERNEST KELLER by: Spector & Oliver
ATTYS.

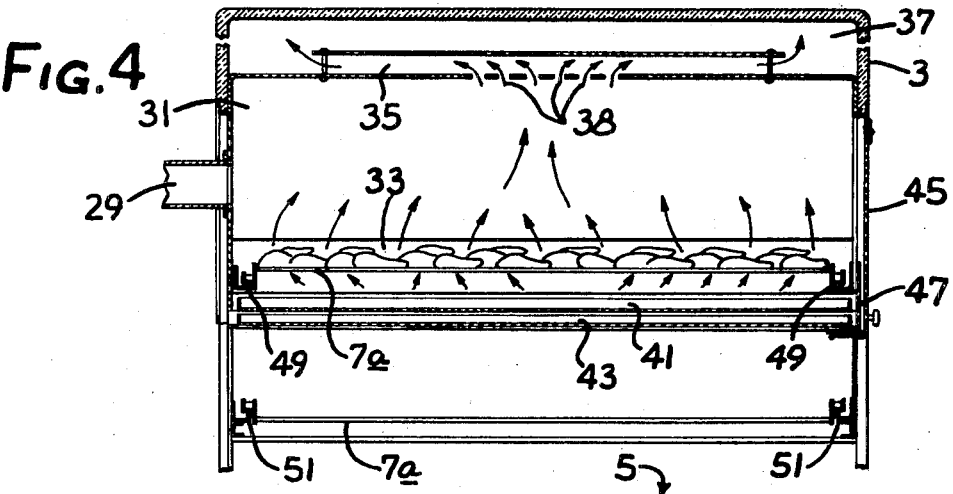
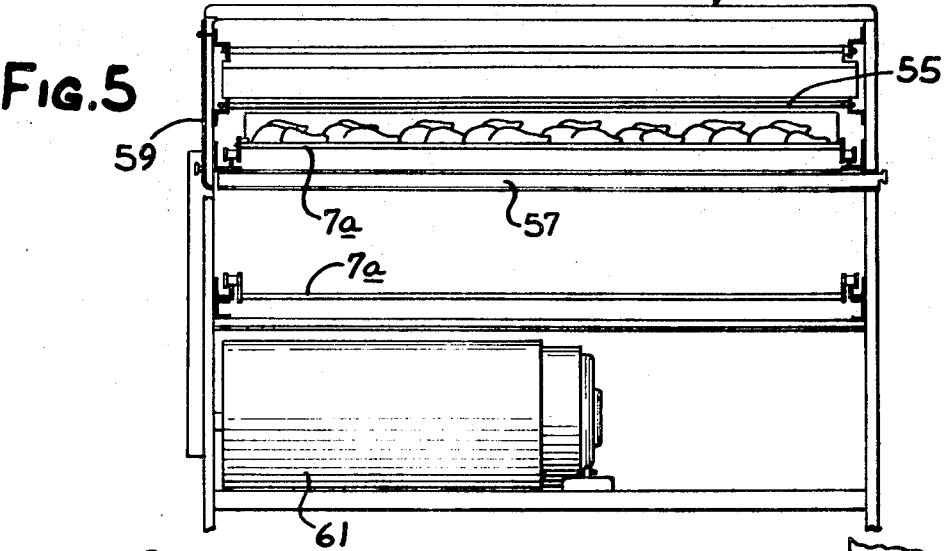
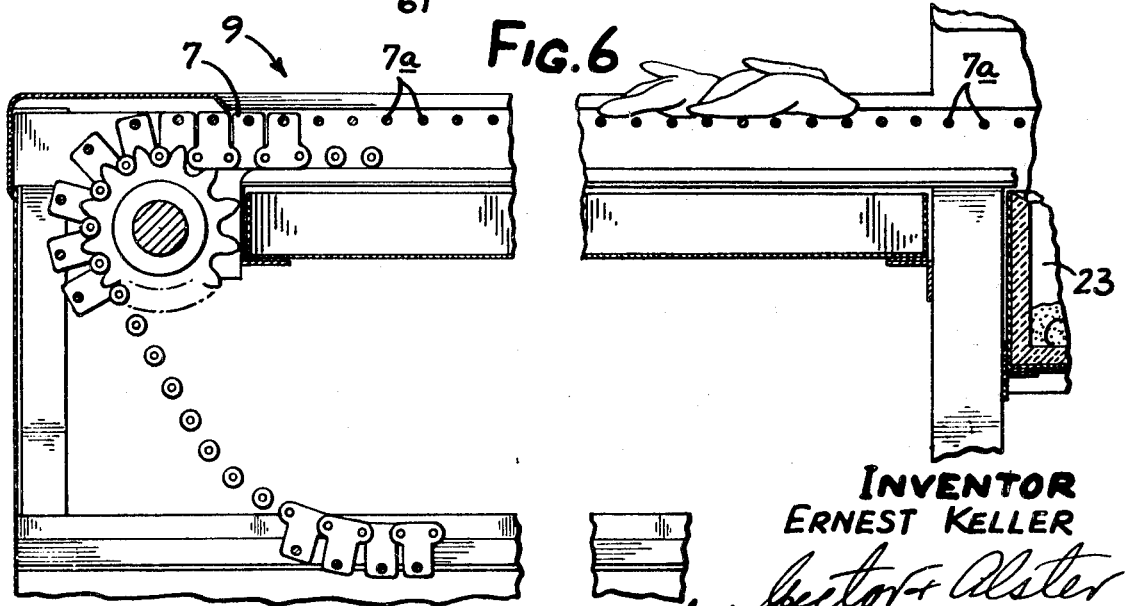

APPARATUS FOR BARBECUING FOOD

This invention relates to a machine for barbecueing food products. Chicken halves, by way of example, are laid on bars of a horizontally moving conveyor, with the bone side facing downwardly, and are moved horizontally, first through a charcoal fire that sears the bone side of the product, then through a microwave heating station where their cooking is substantially completed, then through an infrared heating station to crust and brown the top surface in completion of the cooking process. During almost all of this time, the product is in an atmosphere of the vapors from the charcoal combustion chamber, for imparting a smoke flavor to the product.

It is an object of this invention to provide an apparatus of the above character that can operate in a continuous manner on the conveyor principle to provide a large output of uniformly consistent pieces. It is a further object to provide an apparatus that is economical of construction and simple in operation consistent with a high output.

The attainment of the above and further objects of the present invention will be apparent from the following specification taken in conjunction with the accompanying drawing from a part thereof.

In the drawings:

FIG. 4 is a section taken along the line 4—4 of FIG. 2;

FIG. 5 is a section taken along the line 5—5 of FIG. 2;

FIG. 6 is a fragmentary enlargement of a portion of FIG. 2;

Figure 1:
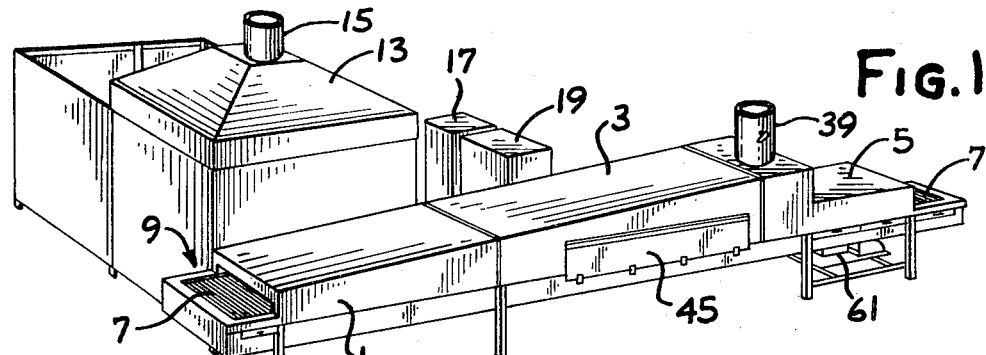
FIG. 1 is an isometric view of an automatic charcoal barbecue apparatus embodying the principles of the present invention.

In the present description the meat product being barbecued is chicken, which may be in the form of chicken halves or other parts of the chicken. The machine, however, is equally capable of barbecueing other products, for instance pork ribs, steaks, chops, or the like.

Reference may now be had more particularly to the drawings wherein like reference numerals designate like parts throughout.

Figure 2:
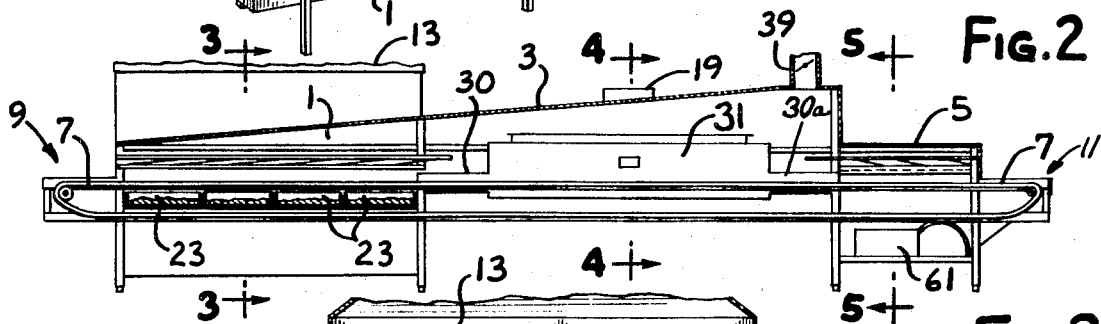
FIG. 2 is a longitudinal sectional view of the apparatus of FIG. 1.

FIGS. 1 and 2 illustrate the general layout of the equipment of the present invention. The machine comprises a charcoal heating section 1 that performs the first stage of the cooking operation, a microwave section 3 that performs the second stage of the cooking action, and an infrared heating section 5 that performs the third stage of the cooking operation. An endless conveyor 7 extends through the three sections and carries the product successively from the input side 9 to the output side 11. A servicing booth 13 is provided for servicing of the charcoal fires. Fumes and light ash and the like are exhausted through an exhaust fan feed outlet 15. A power-controlled cabinet 17 controls a microwave generator 19 that supplies energy to a microwave cavity.

The conveyor 7 extends through the three sections or stations 1,3, and 5, as may be seen from FIG. 2. In one particular embodiment, the belt length in the charcoal section was 8 ½ feet, in the microwave section 12 feet, and in the infrared section 4 feet. This means that when the belt is in continuous motion the food product thereon will be in the charcoal section approximately 35 percent of the cooking time, in the microwave section approximately 49 percent of the time, and in the infrared section approximately 16 percent of the time.

Figure 3:
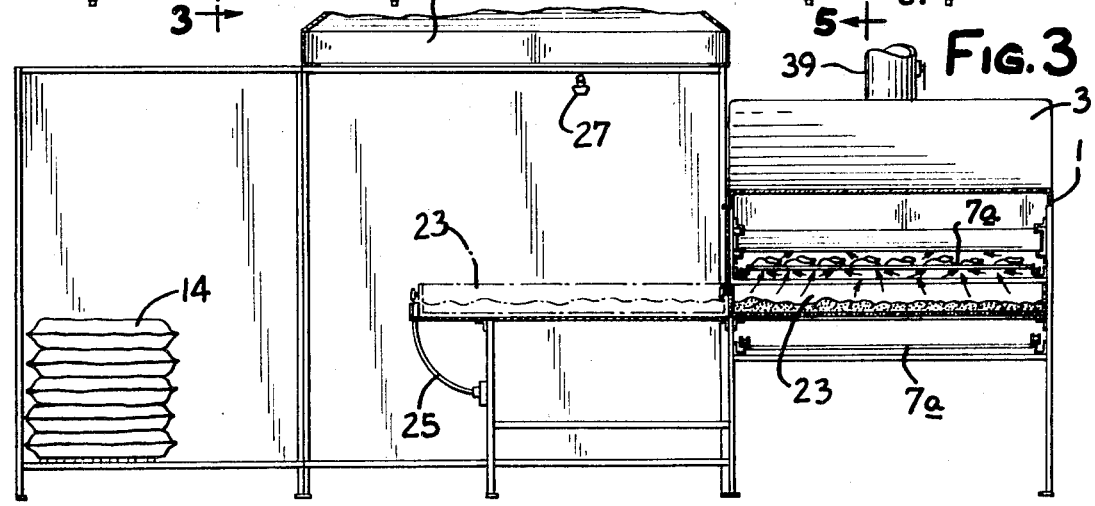
FIG. 3 is a section taken along the line 3—3 of FIG. 2.

The charcoal heating section comprises four identical slidable open-top fireboxes on drawers 23, each of which is individually movable horizontally from its cooking position to its alternate position, as is illustrated in FIG. 3. Each drawer has a built-in electrical starter for starting the burning of the charcoal via an electrical starter cable 25. After the charcoal has been ignited, the drawer is shifted back into position to constitute part of the fireboxes of the cooker. The servicing booth 13 constitutes a housing for catching the exhaust, including fly ashes and the like that escape during starting of the charcoal fire in one of the fireboxes, as well as the ash that is disturbed when additional charcoal is added to the burning charcoal in one of the fireboxes. A water-sprinkling head 27 is provided for fire safety. The servicing booth includes enough space also for storage of bags of charcoal 14.

The microwave section 3 includes a microwave guide 29 that extends from the generator 19 to a microwave cavity or chamber 31. The chamber 31 includes lower and upper attenuation chambers 33–35. The conveyor 17 extends lengthwise through the lower attenuation chamber. Flue gases from the charcoal heating section pass through a conduit 30 into the microwave cavity 31, filling that cavity and imparting a charcoal flavor to the food product therein on the conveyor 7. The charcoal vapors pass through openings in the top of the microwave cavity 31 and flow into an upper flue 37, as indicated by the arrows 38, and out through an exhaust stack 39.

Figure 7:
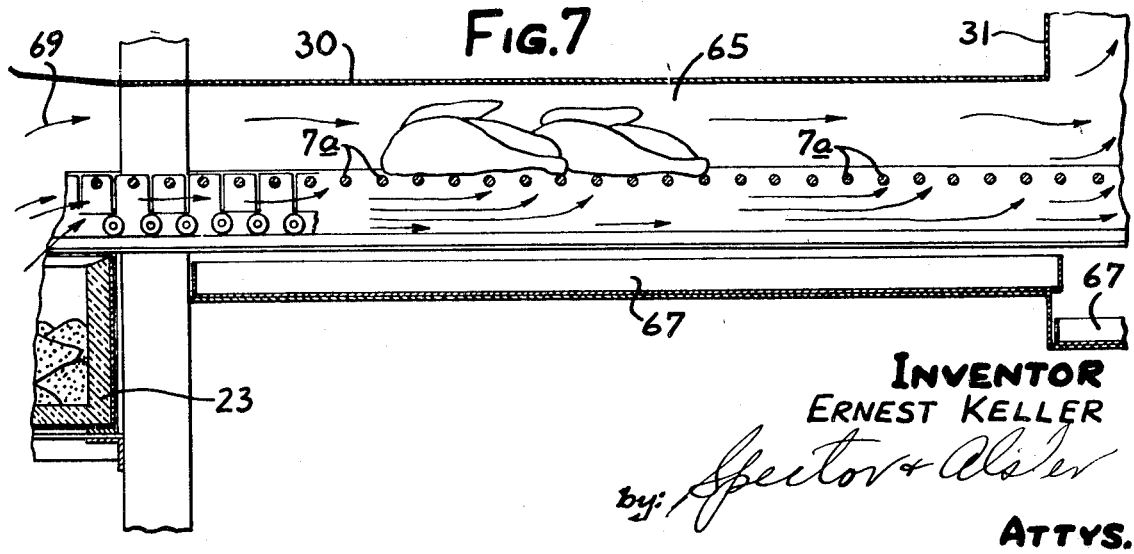
FIG. 7 is an enlargement of another portion of FIG. 2.

Drip pans 41, 43, FIG. 4, also 67, FIG. 7, catch the fat drippings from the cooking meat product. These pans may be slid from the unit by first opening an outer access door 45 that is provided with suitable electrical interlocks to turn off the microwave generator when that door is opened and then opening the inner access door 47. This inner access door 47 is provided with an electrostatic seal to prevent microwave power leakage from the microwave cavity during cooking operation in full compliance with safety regulations.

The infrared heating section 5 includes infrared heating elements 55 above the product that is moving through the section. One or more slidable pans 57 extend under the top metal conveyor grill bars 7a within that section to catch the drippings from the food product. Access to the drawers may be had through an access door 59.

A variable speed motor drive 61 is mounted immediately below the heating chamber of the infrared heating section 5, for driving the conveyor 7.

The mechanical connection between the charcoal heating section and the microwave section is such that charcoal fumes can flow between the two sections, as illustrated in FIGS. 2 and 5. The conduit 30 constitutes an attenuation chamber (FIG. 2), which connects the charcoal heating section 1 with the microwave cavity of the microwave section. A similar conduit 30a, which also constitutes an attenuation chamber for the microwaves, extends from chamber 31 to the section 5. A drip pan 67 immediately below the conveyor catches the dripping from the food products. Charcoal fumes travel as indicated by the arrows 69 in FIG. 5 into the chamber 65 to create a charcoal smoke atmosphere therein.

Chicken halves 80 are laid on the conveyor at the input side thereof. They are laid close to one another. They pass through the charcoal heating section rather quickly, but remain therein long enough to sear the bottom sides thereof, but not long enough to cause any appreciable fat dripping. Dripping of fat at this stage is objectionable because falling into the charcoal fire they not only produce an objectionable smoke or carbon coating at the bottom of the chicken but also change the heat regulation. The product then moves into the microwave section 3 where internal cooking takes place. A large percentage of the charcoal vapors from the open fire continue to flow below the conveyor grill bars into the microwave section and slowly dissipate through whatever openings are present between the chicken halves and of course some are absorbed by the product itself. Moving continuously, the chicken halves move through the microwave section into the infrared section. The main purpose of which is to crust and brown the top surface of the chicken halves in completion of the cooking process. This produces a beautiful broiled appearance for maximum eye appeal.

While the heat control in the first stage, that is the charcoal stage, is not too critical, a fair amount of regulation is obtained with the present firebox arrangement. The total firebox area is divided into four compartments or drawers which are individually movable at 90° to the direction of movement of the conveyor, into the servicing booth 13 for servicing of the fire. The fire may be started for the daily run first in fireboxes 1 and 3. After a delay the fire is started also in boxes 2 and 4. Thus the replenishing of these fires is also staggered providing a fairly level overall heat maintenance. The servicing booth 13 serves to prevent contamination of the cooking unit during servicing of the fires.

In the infrared heating section, the electrical elements are mounted to apply concentrated heat directly above the product. Suitable baffle plates are used to reflect infrared heat rays onto the product.

Access doors are provided on the cooking unit for easy removal of baffle plates for cleaning when necessary. If desired, fire protection may be obtained by providing carbon dioxide units with automatic release to flood all of the cooking compartments, microwave cavity and upper flue spaces.

In compliance with the requirement of the patent statutes, there has here been shown and described a preferred embodiment of the present invention. The invention is, however, not limited to the precise embodiment herein shown. What are considered new and desired to be secured by Letters Patent are the following claims.

I claim:

1. Apparatus for cooking meat which comprises an endless metallic conveyor carrying meat through successive adjacent stations one of which is a charcoal cooking station, another of which is a microwave cooking station, and another of which is an infrared cooking station.

2. Apparatus according to claim 1 wherein hot gases from the charcoal cooking station are conveyed to the microwave cooking station to flavor the meat being cooked at that station.

3. Apparatus according to claim 1 wherein the charcoal section includes a number of separately movable charcoal burning compartments that can be separately moved from their cooking position to a stoking position away from the conveyor so that gases and ashes rising therefrom during stoking move outside of the path of the meat-carrying conveyor.

4. Apparatus according to claim 3 wherein there is an exhaust housing adjacent to the conveyor and receiving the respective charcoal-burning compartments as they are moved from their cooking position.

* * * * *